United States Patent [19]

Hapke et al.

[11] 3,827,779
[45] Aug. 6, 1974

[54] LENS FOCUSING SYSTEM
[75] Inventors: Kenyon A. Hapke, Libertyville; Edwin S. Johnson, Glenview; Joseph J. Sidlo, North Barrington, all of Ill.
[73] Assignee: Bell & Howell Company, Chicago, Ill.
[22] Filed: June 4, 1973
[21] Appl. No.: 366,934

[52] U.S. Cl. ................... 350/255, 350/84, 350/40, 350/44
[51] Int. Cl. ............................................. G02b 7/02
[58] Field of Search .......................... 350/184–187, 350/40–44, 84, 255

[56] References Cited
UNITED STATES PATENTS
2,057,187 10/1936 Gallasch .............................. 350/84
2,984,167 5/1961 Staubach ........................... 350/255
3,209,367 9/1965 Heden ................................ 350/255
3,649,097 3/1972 Davidson ........................... 350/255

Primary Examiner—Ronald L. Wibert
Assistant Examiner—Michael J. Tokar

[57] ABSTRACT

A lens focusing system including eccentric means coupled to shaft means which cooperate to permit the focal length of a lens to be manually adjusted.

7 Claims, 3 Drawing Figures

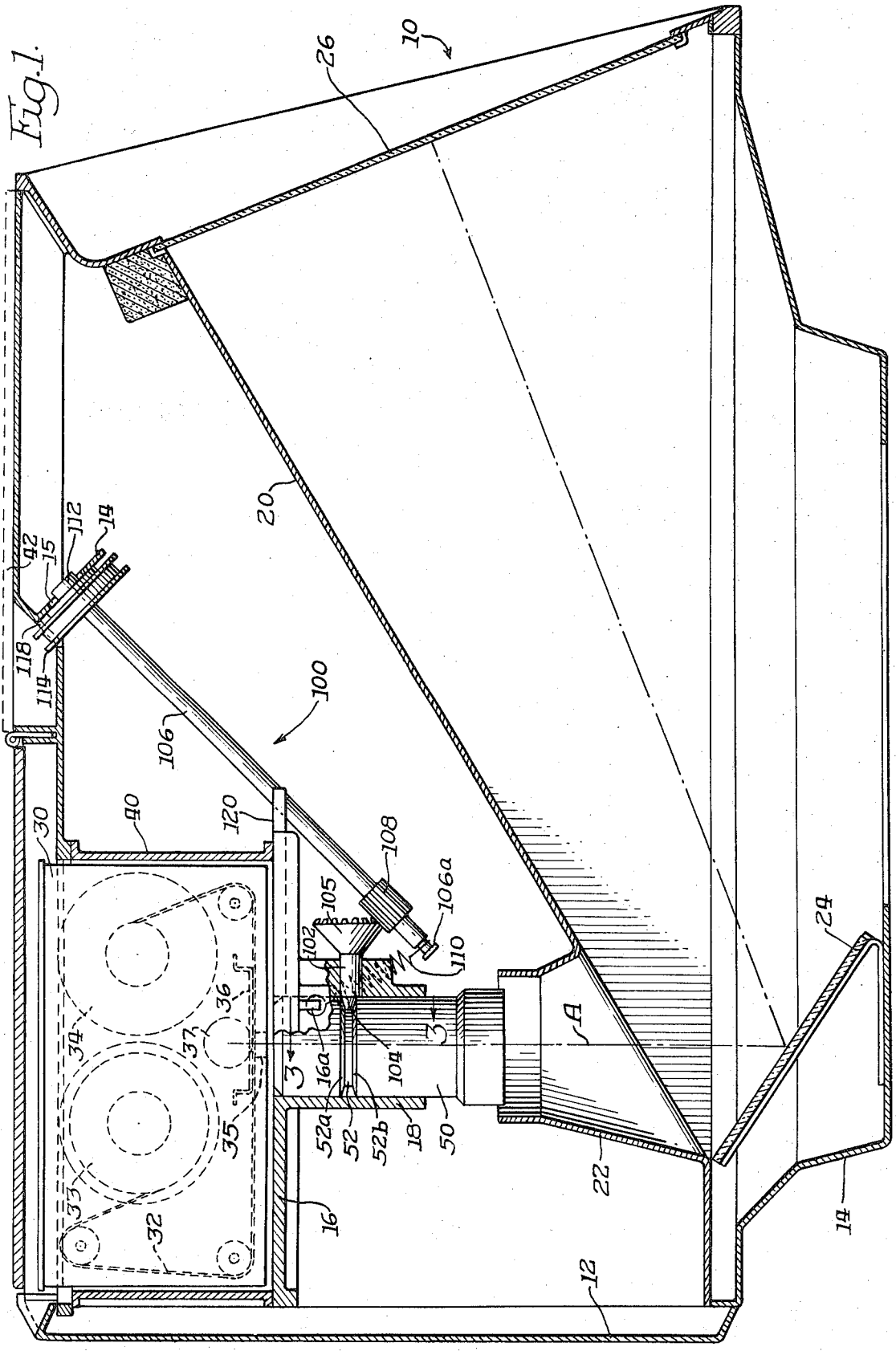

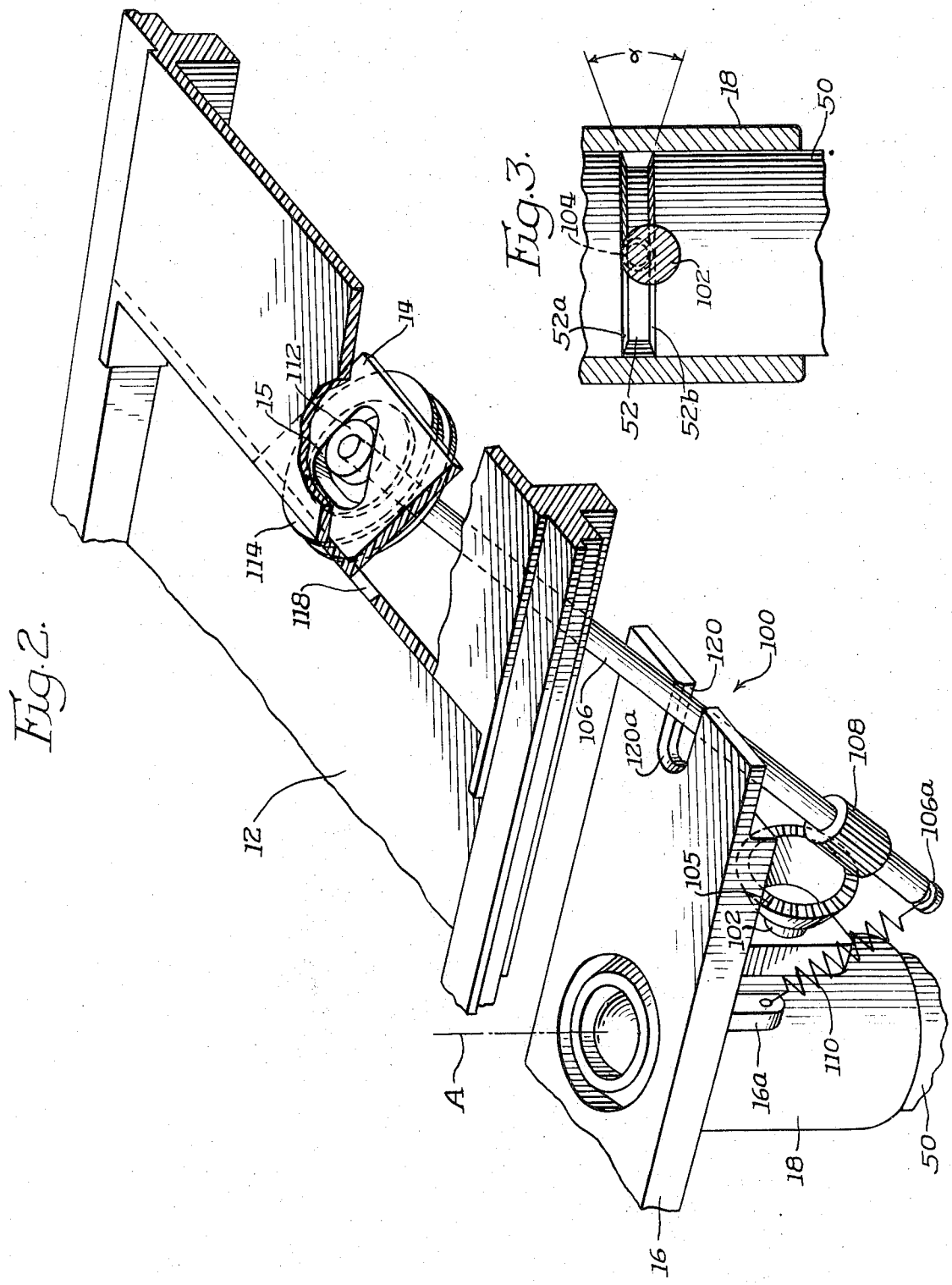

LENS FOCUSING SYSTEM

BACKGROUND AND GENERAL DESCRIPTION

This invention relates generally to a lens focusing system which allows the back focal length of a lens to be readily adjusted to produce a sharply focused projected image.

There is a constant need in the film industry for a suitable system for manually focusing a projection mechanism, such as a slide or motion picture projection machine. A great variety of focusing systems have been developed, but many of them have disadvantages. Frequently, focusing systems have been found to be difficult and expensive to manufacture and assemble. Also, some existing systems fail to secure the lens in a selected position with sufficient force so that the proper focus will be maintained when the projection mechanism is subjected to an external force, such as an unexpected shock load.

Accordingly, this invention provides an improved lens focusing system for projection machines which overcome the foregoing problems. The lens focusing system in accordance with this invention is comprised of a minimum number of components, and is simple and inexpensive to manufacture and assemble. Moreover, the lens focusing system of the present invention is easy to operate manually, is adapted for installation in a variety of locations, and will maintain a selected focus position under severe shock conditions.

Briefly described, the lens focusing system in accordance with this invention includes a movable lens barrel having a lens with a defined optical axis. The barrel also includes a focusing detent for shifting the lens axially along the optical axis. A rotatable focusing member is incorporated in the system to shift the lens axially. The member includes an eccentric pin engageable with the detent on the barrel, and a bevel gear for rotating the member. A rotatable shaft is mounted in a selected position with respect to the focusing member and is provided with a gear engageable with the bevel gear, so that rotation of the shaft rotates the member and the eccentric pin, to thereby focus the lens. Means are also provided to support the shaft in a selected position, and biasing means are arranged to urge the gears into continuous meshing engagement. In addition, abutment means are provided adjacent the shaft to provide the shaft with lateral stability. In the preferred embodiment, the detent on the lens barrel and the eccentric pin are bevelled so that the focusing member and barrel are in selflocking frictional engagement.

EXEMPLARY EMBODIMENT

Additional advantages and features of the present invention will become more apparent from the following description of an exemplary embodiment thereof, taken in conjunction with the accompanying drawings, in which:

FIG. 1 is a cross-sectional elevational view of a film viewer incorporating the focusing system in accordance with the present invention;

FIG. 2 is a partial perspective view of the viewer focusing system; and

FIG. 3 is a partial cross-sectional view of the interface between the focusing system and the lens barrel, as viewed along the lines 3—3 in FIG. 1.

A film viewer adapted for use with the focusing system in accordance with the present invention is generally indicated in the drawings by the reference numeral 10, and the focusing system is generally indicated by the reference numeral 100. The viewer 10 generally includes a frame structure 12 defining a base portion 14 which is adapted to support the viewer on a suitable supporting surface. A movable lens barrel 50, including suitable projection lenses, is supported in a selected position within the viewer 10 by a transport housing 16 connected to the frame structure 12. As seen in FIG. 1, the lens barrel 50 is cylindrical in configuration, and slidably engages with a barrel housing 18 formed as an integral part of the transport housing 16. The lens barrel 50 defines an optical axis A for the viewer 10.

The viewer 10 also includes a conical opaque projection tunnel 20. This tunnel 20 is optically coupled with the lens barrel 50 through an opaque light shielding cone 22 positioned at the lower end of the tunnel 20. The cone 22 is arranged so that the light projected through the lens barrel 50 will be directed into the tunnel 20. A reflection mirror 24 is mounted in a selected position at the base of the tunnel 20 in optical alignment with the axis A of the lens barrel 50. Light projected through the lens barrel 50 will be reflected by the angled mirror 24, and will be projected as an image on the rear projection screen 26.

The illustrated viewer 10 is adapted to project images from a film contained within a protective cassette 30. Accordingly, the upper portion of the transport housing 16 includes a cassette well 40 which is adapted to receive the cassette 30, and to maintain the cassette in a selected position in respect to the lens barrel 50. The cassette 30 includes a supply of film 32 which is retained on a suitable film supply reel 33. The film 32 is fed along a selected path within the cassette 30 to a film take-up reel 34. Suitable driving means (not shown) are provided in the viewer 10 for transporting the film from the supply reel 33 to the take-up reel 34 at a selected speed. The cassette 30 further includes a projection aperture 35, a pressure plate 36 and a light port 37 arranged in optical alignment with the axis A of the lens barrel 50. A suitable light source (not shown) directs projection light through the port 37 and the film 32 to illuminate an image through the aperture 35 along the axis A of the lens barrel 50. The lens barrel 50 projects the light onto the projection screen 26. A cover plate 42 is provided on the viewer 10 to permit access to the cassette well 40, and to close the well 40 to minimize the ambient light within the cassette well 40 during the operation of the viewer 10.

The focusing system 100 in accordance with this invention permits the lens barrel 50 to be shifted axially along the optical axis A to selectively focus the image being projected by the viewer 10 onto the rear projection screen 26. The focusing system 100 includes a circumferential groove 52 provided around the periphery of the lens barrel 50. The edges 52a and 52b of the groove are bevelled at a selected angle, as clearly shown on FIG. 3. The preferred angle for each of the bevelled edges 52a and 52b is approximately 15°, so that the included angle is approximately 30°. As explained hereinafter, the 30° bevel angle assures that the lens barrel 50 is securely locked in the viewer focusing system 100.

The viewer focusing system 100 also includes a rotatable focusing member 102. As seen in FIGS. 1 and 3, the focusing member 102 is mounted for rotation within a bearing opening provided in the barrel housing 18, in alignment with the groove 52 on the lens barrel 50. The inner end of the focusing member 102 includes an eccentric focusing pin 104. The pin 104 is conical in configuration, and is provided with a cone angle which closely coincides with the 30° included angle of the bevelled edges 52a and 52b of the groove 52. In addition, the length of the pin 104 is selected to be slightly less than the depth of the groove 52. By this arrangement, the eccentric pin 104 can be extended into the groove 52, and will firmly wedge against the bevelled edges 52a and 52b during the operation of the focusing system 100. By selecting the cone angle for the eccentric pin 104 to closely coincide with the angle of the bevelled edges 52a and 52b of the groove 52, the friction forces between the pin and the groove are substantially increased, and the pin 104 will be frictionally locked within the groove 52. Moreover, the use of a bevelled angle of approximately 30° assures that an axial force on the lens barrel 50 will not cam the pin 104 out of the groove 52. The eccentric pin 104 and the lens barrel 50 are thereby in self-locking frictional engagement.

In accordance with this invention, the outer end of the focusing member 102 defines a conical bevel gear including gear teeth 105. The pitch and the bevel angle for the teeth 105 are selected to meet the needs of the particular installation in which the focusing system 100 is to be used. The teeth 105 of the bevel gear can be engaged by a gearing system to rotate the focusing member 102 and thereby adjust the axial focusing position of the lens barrel 50 by the eccentric movement of the pin 104 within the groove 52.

The focusing system 100 includes a rotatable focusing shaft 106 which is arranged to control the rotation of the focusing member 102 through the gear teeth 105. The lower end of the shaft 106 carries a spur gear 108 which has gear teeth provided with the same diametral pitch as the teeth 105. The gear ratio between the teeth 105 and the spur gear 108 is also selected to meet the needs of a particular installation, and can be varied readily by changing the pitch diameter of the mating gear teeth.

The use of the bevelled gear teeth 105 eliminates the need for complex gearing between the member 102 and the shaft 106, and provides the focusing system 100 with substantial flexibility in the location of the shaft 106. The shaft 106 could be located in the viewer 10 at a plurality of positions along an arcuate path, while maintaining the spur gear 108 in meshing engagement with the teeth 105 of a suitably selected bevel angle. In the illustrated embodiment the shaft 106 is extended upwardly at an angle of approximately 45' and which is essentially parallel to the sides of the bevelled gear teeth 105.

In accordance with this invention, the gears 105 and 108 are held in close frictional engagement by a suitable biasing means. In the illustrated embodiment, the biasing means comprises a tension spring 110. One end of the spring 110 is rigidly fixed to a mounting bracket 16a provided on the transport housing 16. The other end of the spring 110 is fixed to the lower end of the shaft 106 within a retaining groove 106a. The resulting biasing force produced by the spring 110 firmly engages the spur gear 108 with the bevelled gear teeth 105, and substantially eliminates any backlash between the engaged gear teeth. This spring loaded engagement results in an axial thrust loading on the shaft 102 which thereby prevents the shaft 102 from backing out of engagement with the lens groove 52.

The upper end of the focusing shaft 106 is rotatably supported on an inclined flange portion 14 extending from the frame structure 12. As seen in FIG. 2, the flange 14 includes a triangular slot 15. The upper end of the shaft 106 includes a cylindrical bearing 112 which frictionally engages within the slot 15. The biasing force of the spring 110, operating against the lower end of the shaft 106, rotates the shaft 106 downwardly about a fulcrum formed from the engaging gears 105 and 108. As seen in FIG. 2, the spring 110 thereby forces the upper end of the shaft 106 downwardly and retains the bearing surface 112 in frictional engagement with the converging edges of the triangular slot 15. The slot 15 thereby retains the upper end of the shaft 106 in a selected location within the viewer 10. The materials comprising the flange 14 in the bearing surface 112 are selected so that the resulting coefficient friction between the engaged components permit the bearing surface 112 to freely rotate within the slot 15.

In order to manually rotate the shaft 106, the upper end of the shaft includes a knurled control knob 114. As seen in FIG. 1, a portion of the periphery of the knob 114 extends through a slot 118 provided at the top of the viewer 10. The knob 114 thus can be manually rotated from the top of the viewer 10, to operate the viewer focusing system 100.

The shaft 106 is also retained in the selected position during the operation of the focusing system 100 by being captivated within a slot 120 provided in the transport housing 16. The slot 120 includes a bevelled bearing surface 120a, as seen in FIG. 2, and is dimensioned to receive the intermediate portion shaft 106 within a close tolerance. The biasing force of the spring 110 shifts the shaft 106 into frictional engagement with one edge of a slot 120 during the operation of the viewer focusing system 100. The slot 120 thereby stabilizes the shaft 106 by operating as a stabilizing detent which prevents the shaft 106 and the spur gear 108 from orbiting around the member 102 on the gear teeth 105 when the shaft 106 is rotated. The above-described arrangement for the shaft 106 simplifies the assembly of the focusing system by permitting the shaft 106 to be retained in place by the single spring 110.

The operation of the viewer focusing system 100 is apparent from the above description of the illustrated embodiment. To focus the lens barrel 50, the control knob 114 is manually rotated from the top of the viewer 10. This action rotates the shaft 106 and the bearing surface 112 within the triangular slot 15. Simultaneously, the spur gear 108 transmits a driving torque to the focusing member 102 through the gear teeth 105. The rotation of the focusing member 102 rotates the eccentric pin 104, and causes the lens barrel 50 to be shifted longitudinally along the axis A.

The arrangement of the shaft 106 in accordance with this invention also simplifies the manufacturing and assembling of the viewer 10 allowing for large tolerance accumulations between the shaft and the shaft supporting structure.

Although the present invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A lens focusing system comprising:
   a movable lens barrel including a lens defining an optical axis and a focusing detent;
   a rotatable focusing member including an eccentric portion provided on one end for engagement with said barrel detent and further including a bevel gear on the other end;
   rotatable shaft means including a shaft gear having teeth inclined to mesh with said bevel gear;
   means to rotatably support said shaft with said gear teeth engaged with said bevel gear;
   biasing means urging said gear teeth and bevel gear into continuous engagement; and
   abutment means to restrain said shaft from substantial lateral motion;
   whereby the selective rotation of said shaft means operates through said bevel gear to rotate said focusing member and thereby move said eccentric portion through a selected arc, so that said eccentric portion engages said detent means and adjusts the focus of said system by shifting said lens along said optical axis.

2. A lens focusing system in accordance with claim 1 wherein said focusing detent comprises a bevelled recess provided in said lens barrel and further wherein said eccentric portion comprises a projecting pin bevelled at substantially the same angle as said lens barrel recess so that the engagement between said pin and barrel is frictionally self-locking.

3. A lens focusing system in accordance with claim 1 wherein said shaft support means engages one portion of said shaft and supports said shaft so that said shaft gear is unrestrained, and further wherein said biasing means comprises a spring engaged with said shaft and retaining said shaft gear engaged with said bevel gear.

4. A lens focusing system in accordance with claim 3 wherein said abutment means comprises a stationary member arranged adjacent said shaft in a position so that said spring forces said shaft against said stationary member, whereby said shaft is laterally stabilized during the operation of said focusing system.

5. A lens focusing system in accordance with claim 4 wherein said shaft support means comprises a bearing joined to said shaft and a stationary bearing sleeve means adapted to receive said bearing and arranged with respect to said shaft so that the biasing force of said spring retains said bearing rotatably engaged with said shaft.

6. A lens focusing system in accordance with claim 5 wherein said bearing sleeve comprises a groove having converging bearing surfaces and arranged so that said spring force wedges said bearing into engagement with said converging surfaces.

7. A lens focusing system comprising:
   a movable lens barrel including a lens defining an optical axis and a focusing detent;
   a rotatable focusing member including an eccentric portion provided on one end for engagement with said barrel detent and further including a bevel gear on the other end;
   an inclined rotatable shaft means including a shaft gear adjacent one end engageable with said bevel gear and further including a shaft bearing adjacent the other end;
   a stationary bearing sleeve arranged to engage said shaft bearing and rotatably support said shaft means in said inclined position;
   biasing means engaged with said shaft adjacent said one end urging said shaft gear into continuous engagement with said bevel gear and further urging said shaft bearing into said sleeve; and
   abutment means positioned to engage said shaft intermediate said shaft ends to restrain said shaft from substantial lateral motion;
   whereby the selective rotation of said shaft means operates through said bevel gear to rotate said focusing member and thereby move said eccentric portion through a selected arc, so that said eccentric portion engages said detent means and adjusts the focus of said system by shifting said lens along said optical axis.

* * * * *